United States Patent
Hsu

(10) Patent No.: US 8,215,682 B2
(45) Date of Patent: *Jul. 10, 2012

(54) UNLOCKING STRUCTURE AND CONNECTOR HOLDING STRUCTURE

(75) Inventor: Yung-Chin Hsu, Taoyuan County (TW)

(73) Assignee: Inventec Corporation, Taipei (TW)

( * ) Notice: Subject to any disclaimer, the term of this patent is extended or adjusted under 35 U.S.C. 154(b) by 643 days.

This patent is subject to a terminal disclaimer.

(21) Appl. No.: 12/396,625

(22) Filed: Mar. 3, 2009

(65) Prior Publication Data

US 2010/0101285 A1 Apr. 29, 2010

(30) Foreign Application Priority Data

Oct. 23, 2008 (TW) ................................ 97140698 A

(51) Int. Cl.
*E05C 19/06* (2006.01)
*E05C 19/00* (2006.01)

(52) U.S. Cl. .................... 292/83; 292/80; 292/DIG. 63; 312/223.1

(58) Field of Classification Search .................... 292/80, 292/81, 83, 87, 89, DIG. 63; 312/223.1; 361/679.58

See application file for complete search history.

(56) References Cited

U.S. PATENT DOCUMENTS

| 5,056,846 | A | * | 10/1991 | Tanaka | 296/37.1 |
| 5,220,712 | A | * | 6/1993 | Taki et al. | 24/614 |
| 5,918,956 | A | * | 7/1999 | Scholder | 312/223.2 |
| 6,814,377 | B2 | * | 11/2004 | Silverman et al. | 292/83 |
| 2007/0085453 | A1 | * | 4/2007 | Zhang et al. | 312/7.2 |

* cited by examiner

*Primary Examiner* — Carlos Lugo
(74) *Attorney, Agent, or Firm* — J.C. Patents

(57) ABSTRACT

An unlocking structure including a board element, a locking element, and a guiding element is provided. The board element has a first surface, a second surface, and at least one first opening. The locking element with at least one hook and at least one first elastic arm is disposed on the first surface of the board element. The hook is connected to the first elastic arm and passes through the first opening to protrude from the second surface of the board element. The guiding element is slidingly disposed on the first surface of the board element and is located between the board element and the locking element. The guiding element has at least one guiding inclined plane. The guiding inclined plane is suitable to structurally interfere with the first elastic arm, so as to drive the hook to exit from the second surface towards the first surface.

6 Claims, 2 Drawing Sheets

UNLOCKING STRUCTURE AND CONNECTOR HOLDING STRUCTURE

CROSS-REFERENCE TO RELATED APPLICATION

This application claims the priority benefit of Taiwan application serial no. 97140698, filed on Oct. 23, 2008. The entirety of the above-mentioned patent application is hereby incorporated by reference herein and made a part of specification.

BACKGROUND OF THE INVENTION

1. Field of the Invention

The present invention generally relates to a holding structure, in particular, to a connector holding structure.

2. Description of Related Art

In the current information multimedia time, computers undoubtedly become one of the necessities in our life and work. Servers, workstations, desktop computers, notebook computers, or even industrial computers have become the indispensable important tools.

Generally, a computer may substantially include a host part, a display, and peripheries. The host part includes a computer case, and electronic elements disposed in the computer case, such as a main board, a central processing unit, and a memory. In addition, storage devices such as a hard disk, a floppy disk, and a CD-ROM drive are also disposed inside the computer case. The upgrading of computer parts, the expansion of capacity of storage devices, or the damage of parts all urges the consumers to replace the computer parts. Therefore, the convenience of installation and maintenance of the computer parts becomes quite important.

After the storage device, such as a hard disk, is replaced or installed, users must insert connectors of front ends of a flat cable and a power supply cable into slots of the storage device and the circuit board, so as to enable the storage device to operate. However, as an inner space of the computer case is limited, hands of the user difficultly move in the case, such that the connector is hard to be aligned with the slot. Therefore, insertion and extraction of the connector are quite inconvenient.

SUMMARY OF THE INVENTION

Accordingly, the present invention is directed to an unlocking structure and a connector holding structure, for conveniently unlocking a hook and installing a connector.

The present invention provides an unlocking structure, which includes a board element, a locking element, and a guiding element. The board element has a first surface, a second surface, and at least one first opening. The locking element with at least one hook and at least one first elastic arm is disposed on the first surface of the board element. The hook is connected to the first elastic arm and passes through the first opening to protrude from the second surface of the board element. The guiding element is slidingly disposed on the first surface of the board element and is located between the board element and the locking element. The guiding element has at least one guiding inclined plane. The guiding inclined plane is suitable to structurally interfere with the first elastic arm, so as to drive the hook to exit from the second surface towards the first surface.

In an embodiment of the present invention, the guiding element further has a second opening, and the board element has a third opening. When the hook protrudes from the second surface, a central position of the second opening and a central position of the third opening define a sliding stroke of the guiding element.

In an embodiment of the present invention, when the hook exits, the central position of the second opening and the central position of the third opening are substantially coincident.

In an embodiment of the present invention, the board element further has a stopping portion. The guiding element further has a second elastic arm corresponding to the stopping portion. The second elastic arm is connected to the guiding inclined plane. When the hook exits, the second elastic arm structurally interferes with the stopping portion, such that the second elastic arm elastically deforms.

The present invention further provides a connector holding structure, which includes a frame, a board element, a locking element, and a guiding element. The frame includes a main body, and the main body has at least one locking groove. The board element is slidingly disposed on the frame, and has a first surface, a second surface, and at least one first opening. The connector is fixed on the board element. The locking element is disposed on the first surface of the board element, and has at least one hook and at least one first elastic arm. The hook is connected to the first elastic arm, and passes through the first opening to protrude from the second surface of the board element, so as to lock with the locking groove. The guiding element is slidingly disposed on the first surface of the board element, and is located between the board element and the locking element. The guiding element has at least one guiding inclined plane. The guiding inclined plane is suitable to structurally interfere with the first elastic arm, so as to drive the hook to exit from the locking groove from the second surface towards the first surface.

In an embodiment of the present invention, the guiding element has a second opening, and the board element has a third opening. When the hook protrudes from the second surface, a central position of the second opening and a central position of the third opening define a sliding stroke of the guiding element.

In an embodiment of the present invention, when the hook exits, the central position of the second opening and the central position of the third opening are substantially coincident.

In an embodiment of the present invention, the board element further has a stopping portion. The guiding element further has a second elastic arm corresponding to the stopping portion, and the second elastic arm is connected to the guiding inclined plane. When the hook exits, the second elastic arm structurally interferes with the stopping portion, such that the second elastic arm elastically deforms.

In an embodiment of the present invention, the frame further has two first guide rails respectively located on two opposite sides of the frame. The board element further has two second guide rails respectively located on two opposite sides of the board element. The board element is slidingly disposed on the frame as the two second guide rails match with the two first guide rails.

In an embodiment of the present invention, the frame further includes two fixing portions fixed on the main body, and the two first guide rails are respectively fixed on the two fixing portions.

In the unlocking structure of the present invention, through the interference between the guiding inclined plane and the elastic arm of the locking element, the hook of the locking element is unlocked, so the operation is quite simple and convenient. In addition, through the connector holding structure of the present invention, the connector is installed on the frame through the board element. Therefore, in the present invention, the installation of the connector is much more convenient.

In order to have a further understanding of above features and advantages of the present invention, a detailed description is given below with embodiments and accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
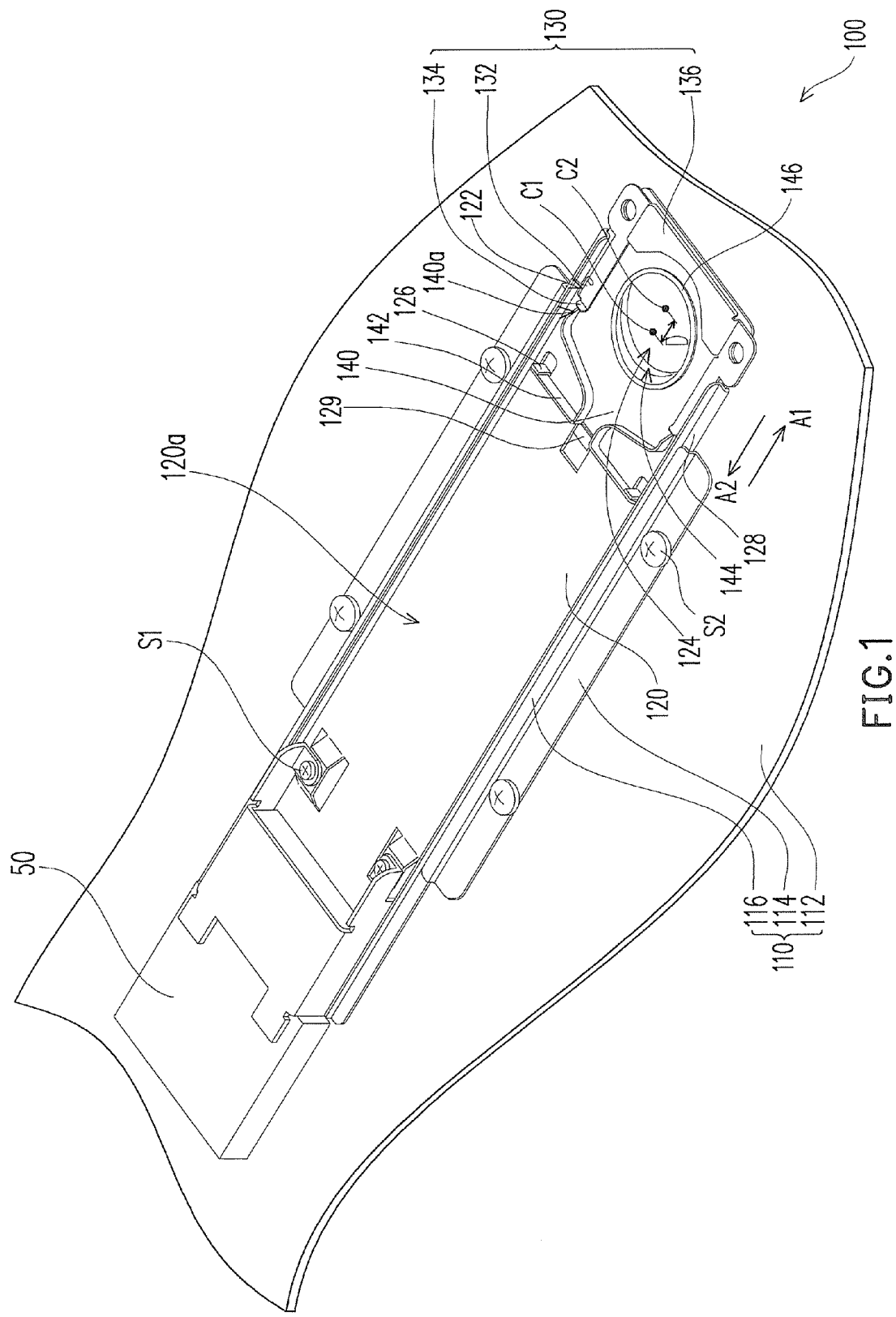
FIG. 1 is a three-dimensional view of a connector holding structure according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
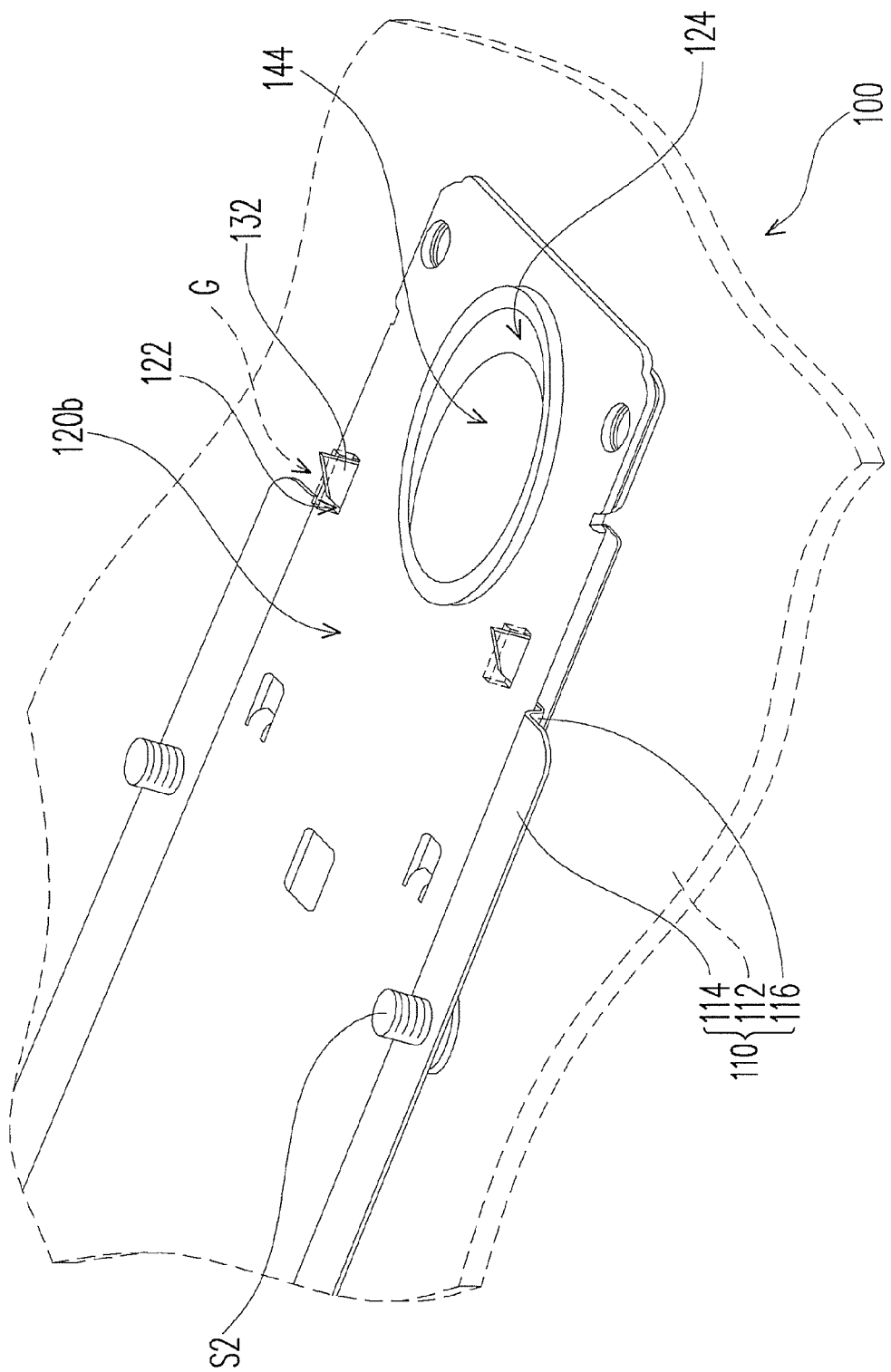
FIG. 2 is a partial three-dimensional view of the holding structure of FIG. 1 from another view of angle.

FIG. 1 is a three-dimensional view of a connector holding structure according to an embodiment of the present invention, and FIG. 2 is a partial three-dimensional view of the holding structure of FIG. 1 from another view of angle. Referring to FIGS. 1 and 2, a holding structure 100 mainly includes a frame 110, a board element 120, a locking element 130, and a guiding element 140. The holding structure 100 is suitable to hold a connector 50. In this embodiment, the connector 50 may be fixed on the board element 120 through a plurality of screws S1, such that the connector 50 may be driven by the board element 120 to be installed in a slot of a storage device (not shown) or a circuit board (not shown).

The frame 110 includes a main body 112, and the main body 112 has at least one locking groove G. The board element 120 is slidingly disposed on the frame 110, and has a first surface 120a, a second surface 120b, and at least one first opening 122. In particular, the frame 110 further includes two first guide rails 116 respectively located on two opposite sides of the frame 110. The board element 120 further has two second guide rails 128 respectively located on two opposite sides of the board element 120. The two first guide rails 116 are respectively corresponding to the two second guide rails 128, and the board element 120 is slidingly disposed on the frame 110 as the two second guide rails 128 match with the two first guide rails 116.

In addition, the frame 110 further includes two fixing portions 114. The two fixing portions 114 are symmetrically fixed on the main body 112. The two first guide rails 116 are respectively fixed on the two fixing portions 114. That is to say, the two first guide rails 116 may be respectively fixed on the main body 112 through the two fixing portions 114. In this embodiment, the two fixing portions 114 may be fixed on the main body 112 through a plurality of screws S2. However, in another not-shown embodiment, the main body 112, the two fixing portions 114, and the two first guide rails 116 may also be integrally formed.

The locking element 130 is disposed on the first surface 120a of the board element 120, and has at least one hook 132 and at least one first elastic arm 134. The hook 132 is connected to the first elastic arm 134, and passes through the first opening 122. The hook 132 protrudes from the second surface 120b of the board element 120, so as to lock with the locking groove G.

The guiding element 140 is slidingly disposed on the first surface 120a of the board element 120, and is located between the board element 120 and the locking element 130. In particular, the board element 120 has, for example, a first limiting portion 129, and the locking element 130 further has a second limiting portion 136. The first limiting portion 129 and the second limiting portion 136 are respectively located on two sides of the guiding element 140, so as to approximately fix the guiding element 140 on the first surface 120a of the board element 120.

In addition, the guiding element 140 has at least one guiding inclined plane 140a. The guiding inclined plane 140a is suitable to structurally interfere with the first elastic arm 134, so as to drive the hook 132 to exit from the locking groove G from the second surface 120b towards the first surface 120a. In this embodiment, the guiding element 140 further has a second opening 144 and an operation portion 146, and the board element 120 further has a third opening 124. The operation portion 146 is located on one side of the second opening 144. When a user does not press the operation portion 146, the second opening 144 and the third opening 124 are partially coincident, and a distance D is maintained between a central position C1 of the second opening 144 and a central position C2 of the third opening 124.

When the hook 132 protrudes from the second surface 120b and is locked with the locking groove G, a finger of the user may firstly passes through the coincident part of the second opening 144 and the third opening 124. Then, the finger presses the operation portion 146, such that the guiding element 140 slides relative to the board element 120 towards a first direction A1. When the guiding element 140 slides, the coincident part of the second opening 144 and the third opening 124 is gradually increased, until the central position C1 of the second opening 144 and the central position C2 of the third opening 124 are substantially coincident. That is to say, the distance D between the central position C1 of the second opening 144 and the central position C2 of the third opening 124 defines a sliding stroke of the guiding element 140. In this embodiment, shapes and sizes of the second opening 144 and the third opening 124 are approximately the same, such that the distance D may define the sliding stroke of the guiding element 140.

Further, when the guiding element 140 slides relative to the board element 120 towards the first direction A1, the guiding inclined plane 140a contacts with the first elastic arm 134, such that the first elastic arm 134 elastically deforms towards a direction away from the first surface 120a. In this manner, the hook 132 is driven by the first elastic arm 134 to exit from the locking groove G, thereby releasing a locking relation between the board element 120 and the frame 110, such that the board element 120 may be disassembled from the frame 110.

In addition, the guiding element 140 further has a second elastic arm 142. The board element 120 further has the stopping portion 126 corresponding to the second elastic arm 142. The second elastic arm 142 is connected to the guiding inclined plane 140a. When the guiding element 140 slides relative to the board element 120, and makes the hook 132 exit, the second elastic arm 142 structurally interferes with the stopping portion 126, such that the second elastic arm 142 elastically deforms. After a force of pressing the operation portion 146 applied by the user is released, under a restoring force generated by the elastic deformation of the second elastic arm 142, the guiding element 140 slides relative to the board element 120 towards a second direction A2, such that the structural interference between the guiding inclined plane 140a and the first elastic arm 134 is released. Here, through a restoring force generated by the elastic deformation of the first elastic arm 134, the hook 132 is driven to move from the first surface 120a towards the second surface 120b, so as to protrude from the second surface 120b.

In addition, when the board element 120 is slidingly installed on the frame 110, when the hook 132 contacts with the frame 110, the hook 132 is structurally interfered by the frame 110 to move from the second surface 120b towards the first surface 120a, such that the first elastic arm 134 elastically deforms. Then, when the hook 132 is aligned with the locking groove G, the hook 132 ejects because of the restoring force generated by the elastic deformation of the first elastic arm 134. At this time, the hook 132 is locked with the locking groove G. The connector 50 is driven by the board element 120 to be installed in the corresponding slot of the storage device or the circuit board.

To sum up, in the unlocking structure of the present invention, through the interference between the guiding inclined plane and the elastic arm of the locking element, the hook of the locking element is unlocked, so the operation is quite simple and convenient. In addition, through the connector holding structure of the present invention, the connector is installed on the frame through the board element, such that the connector can be aligned with the slot of the storage device or the circuit board. Therefore, the installation of the connector is quite convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An unlocking structure, comprising:
   a board element, comprising a first surface, a second surface, and at least one first opening;
   a locking element, disposed on the first surface of the board element, and comprising at least one hook and at least one first elastic arm, wherein the hook is connected to the first elastic arm, and passes through the first opening to protrude from the second surface of the board element; and
   a guiding element, adapted to move through an external force, slidingly disposed on the first surface of the board element, located between the board element and the locking element, and comprising at least one guiding inclined plane, wherein the guiding inclined plane is suitable to structurally interfere with the first elastic arm, so as to drive the hook to exit from the second surface towards the first surface, wherein the guiding element further comprises a second opening, and the board element further comprises a third opening, when the hook protrudes from the second surface, a central position of the second opening and a central position of the third opening define a sliding stroke of the guiding element, and when the hook exits, the central position of the second opening and the central position of the third opening are substantially coincident.

2. The unlocking structure according to claim 1, wherein the board element further comprises a stopping portion, the guiding element further comprises a second elastic arm corresponding to the stopping portion, and the second elastic arm is connected to the guiding inclined plane, when the hook exits, the second elastic arm structurally interferes with the stopping portion, such that the second elastic arm elastically deforms.

3. A connector holding structure, comprising:
   a frame, comprising a main body, wherein the main body comprises at least one locking groove;
   a board element, slidingly disposed on the frame, and comprising a first surface, a second surface, and at least one first opening, wherein the connector is fixed on the board element;
   a locking element, disposed on the first surface of the board element, and comprising at least one hook and at least one first elastic arm, wherein the hook is connected to the first elastic arm, passes through the first opening to protrude from the second surface of the board element, so as to lock with the locking groove; and
   a guiding element, adapted to move through an external force, slidingly disposed on the first surface of the board element, located between the board element and the locking element, and comprising at least one guiding inclined plane, wherein the guiding inclined plane is suitable to structurally interfere with the first elastic arm, so as to drive the hook to exit from the locking groove from the second surface towards the first surface, wherein the guiding element further comprises a second opening, and the board element further comprises a third opening, when the hook protrudes from the second surface, a central position of the second opening and a central position of the third opening define a sliding stroke of the guiding element, and when the hook exits, the central position of the second opening and the central position of the third opening are substantially coincident.

4. The connector holding structure according to claim 3, wherein the board element further comprises a stopping portion, the guiding element further comprises a second elastic arm corresponding to the stopping portion, and the second elastic arm is connected to the guiding inclined plane, when the hook exits, the second elastic arm structurally interferes with the stopping portion, such that the second elastic arm elastically deforms.

5. The connector holding structure according to claim 3, wherein the frame further comprises two first guide rails respectively located on two opposite sides of the frame, the board element further comprises two second guide rails respectively located on two opposite sides of the board element, and the board element is slidingly disposed on the frame as the two second guide rails match with the two first guide rails.

6. The connector holding structure according to claim 5, wherein the frame further comprises two fixing portions fixed on the main body, and the two first guide rails are respectively fixed on the two fixing portions.

* * * * *